(12) United States Patent
Wu et al.

(10) Patent No.: US 7,153,918 B2
(45) Date of Patent: Dec. 26, 2006

(54) RANDOM ETHYLENE/ALKYL ACRYLATE COPOLYMERS, COMPOUNDS AND ELASTOMERIC COMPOSITIONS THEREOF WITH IMPROVED LOW TEMPERATURE PROPERTIES

(75) Inventors: Yun-Tai Wu, Bryn Mawr, PA (US); Mark Aaron Stewart, Wilmington, DE (US); David John Mitchell, Kingston (CA); Edward McBride, Wilmington, DE (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 140 days.

(21) Appl. No.: 10/892,006

(22) Filed: Jul. 15, 2004

(65) Prior Publication Data

US 2005/0020775 A1 Jan. 27, 2005

Related U.S. Application Data

(60) Provisional application No. 60/490,296, filed on Jul. 24, 2003.

(51) Int. Cl.
*C08F 234/04* (2006.01)
(52) U.S. Cl. .................. 526/308; 526/318; 526/348
(58) Field of Classification Search ............. 526/308, 526/318, 348
See application file for complete search history.

(56) References Cited

U.S. PATENT DOCUMENTS

| | | | |
|---|---|---|---|
| 3,873,494 A | 3/1975 | Lewis | |
| 3,883,472 A | 5/1975 | Greene et al. | |
| 3,904,588 A | 9/1975 | Greene et al. | |
| 4,275,180 A | 6/1981 | Clarke | |
| 5,194,516 A * | 3/1993 | Fisher et al. ............... | 525/387 |
| 5,498,669 A | 3/1996 | Williams | |
| 6,136,920 A | 10/2000 | Hert et al. | |

FOREIGN PATENT DOCUMENTS

| | | |
|---|---|---|
| JP | 99-343378 A | 12/1999 |
| JP | 2000-44757 A | 2/2000 |

* cited by examiner

*Primary Examiner*—Robert D. Harlan

(57) ABSTRACT

Disclosed are random copolymers derived from ethylene and at least two different alkyl acrylate comonomers, with or without an acid cure site-containing comonomer. In particular, disclosed are copolymers derived from copolymerization of (a) from 10 to 50 weight % of ethylene; (b) from 5 to 55 weight % of a first alkyl acrylate; (b) from 15 to 80 weight % of a second alkyl acrylate; and (d) from 0 to 7 weight % of a monoalkyl ester of 1,4-butene-dioic acid. Such copolymers exhibit lower glass transition temperatures (Tg) relative to previous ethylene copolymers comprising a single alkyl acrylate comonomer and maintain the good heat and fluid resistance when employed to produce cured elastomeric compositions as well as the improved low temperature properties. This invention also provides compounded compositions comprising these copolymers, and cured compositions (i.e., vulcanizates) as well as rubber articles formed from these compounded compositions, such as hoses, dampers, seals, gaskets, constant velocity joint (CVJ) boots and shaft boots.

36 Claims, No Drawings

RANDOM ETHYLENE/ALKYL ACRYLATE COPOLYMERS, COMPOUNDS AND ELASTOMERIC COMPOSITIONS THEREOF WITH IMPROVED LOW TEMPERATURE PROPERTIES

CROSS-REFERENCE TO RELATED APPLICATIONS

Applicant claims the benefit of priority to provisional application 60/490,296 filed Jul. 24, 2003; herein incorporated by reference in its entirety.

BACKGROUND OF THE INVENTION

1. Field of the Invention

The present invention relates to ethylene copolymers derived from ethylene and at least two different alkyl acrylates comonomers, with or without additional comonomer containing acid cure sites, which exhibit lower glass transition temperatures (Tg) and also relates to compounded compositions and cured vulcanizates using these copolymers and rubber articles manufactured therefrom, which exhibit improved low temperature properties yet maintain the good heat and fluid resistance of previous ethylene copolymers comprising a single alkyl acrylate comonomer. More specifically, but not by way of limitation, the present invention relates to ethylene terpolymers optionally containing a fourth cure site containing monomer (for example, ethylene/methyl acrylate/n-butyl acrylate/ethyl hydrogen maleate) and fabricated rubber articles derived therefrom (e.g., ignition wire jacketing, hoses, dampers, seals, gaskets, spark plug boots, constant velocity joint boots and shaft boots).

2. Description of the Related Art

The automotive and transportation industries use elastomeric (rubber-like) materials for a number of parts that require elastic properties such as gaskets, seals, hoses, dampers, etc. These parts require good heat and oil swell resistance. A number of synthetic polymeric materials have been provided for these applications.

U.S. Pat. Nos. 3,883,472 and 3,904,588 disclose ethylene/acrylic ester/butenedioic acid monoester terpolymers, compounds and vulcanizates thereof.

U.S. Pat. No. 5,498,669 discloses blends of ethylene/alkyl acrylate dipolymers, neutralized ethylene acid copolymers (ionomers) and organic peroxides, useful for continuous pressureless curing processes.

The compounds of the ethylene/alkyl acrylate copolymers and blends described in U.S. Pat. Nos. 3,883,472; 3,904,588 and 5,498,669 have very good resistance to both heat and fluid, and when plasticized are disclosed to have brittle points below −40° C., as measured by ASTM D746-70. These prior art copolymers have polymer glass transition temperatures (Tg) by differential scanning calorimetry (DSC) of −21 to −30° C., ASTM method E1356-98 (using the inflection point as Tg).

However, trends in the automotive industry are simultaneously towards higher under-hood temperature, use of new fluids for improved vehicular performance and longer parts service life, which requires lower temperature capability of the elastomer system. These trends are driven by new environmental regulations, market demands for better fuel economy, and longer warranties offered by automotive manufacturing companies. As a result, elastomeric materials used in making automotive parts (gaskets, seals, hoses, dampers, etc.) are required to have wider ranges (both high and low) of service temperature capabilities and good fluid resistance to meet the new design demands. Such a combination of properties and moderate cost are highly desired.

BRIEF SUMMARY OF THE INVENTION

In view of the above, the present invention provides novel copolymers, compounded compositions involving these copolymers and elastomeric compositions derived from curing/crosslinking the compounded compositions, which have expanded lower Tg range as exhibited by lower polymer Tg while maintaining the good heat and fluid resistance of current elastomeric materials.

Thus, this invention provides random copolymers that exhibit a glass transition temperature below −25° C., preferably below −30° C. (more preferably, below −35° C.) measured by differential scanning calorimetry (DSC) on dried/devolatized copolymer according to ASTM method E1356-98 (using the inflection point) and an oil immersion volume increase of the cured compounded compositions (an indicator of the absorbance of fluids into the bulk composition causing swelling) less than 110%, preferably less than 90%, measured according to ASTM D471-96 by immersion in ASTM IRM 903 oil for 168 hours at 150° C. In presenting the Tg data hereinafter, it should be appreciated that the measurements were based on DSC, which for purposes of the present invention, is felt to be a more accurate and reproducible direct measurement of the secondary polymeric morphology change contributing to the low temperature properties attributable to the polymer, per se. This is felt to be particularly true relative to the historical Brittle Point measurement as listed in the prior art, which was an impact test observing break using five test specimens while recording the lowest temperature at which no specimen experiences break. In this invention, the Brittle Point measurement is by ASTM D2137-94 as recommended for cured elastomer systems.

We have discovered that ethylene copolymers comprising ethylene copolymerized with two different alkyl acrylate comonomers will have a balance of heat and oil resistance with a lower glass transition temperature range. When such lower Tg copolymers are employed in rubber compound compositions and ultimately cured to produce corresponding elastomeric compositions their presence will enhance the low temperature properties, while maintaining good heat and oil resistance.

Accordingly, this invention provides, in one embodiment, a copolymer derived from copolymerization of
  from 10 to 50 weight % of ethylene;
  from 5 to 55 weight % of a first alkyl acrylate;
  from 15 to 80 weight % of a second alkyl acrylate; and
  from 0 to 7 weight % of a monoalkyl ester of 1,4-butene-dioic acid, wherein all weight percents are based on total weight of components (a) through (d) in the copolymer.

Preferably, the copolymer contains monoalkyl ester of 1,4-butene-dioic acid moieties that function as cure sites at a loading from about 0.5 to 7 weight percent of the total copolymer (more preferably from 1 to 6 wt % and still more preferably from 2 to 5 wt %).

Thus, a preferred copolymer is derived from copolymerization of
  from 18 to 50 weight % of ethylene;
  from 10 to 40 weight % of a first alkyl acrylate;
  from 15 to 65 weight % of a second alkyl acrylate; and
  from 2 to 5 weight % of a monoalkyl ester of 1,4-butene-dioic acid.

Preferably the first alkyl acrylate is either methyl acrylate or ethyl acrylate and the second (and different) alkyl acrylate has from 2 to 10 carbon atoms in the alkyl group (more preferably from 4 to 8). Preferably the total acrylate content comprises from about 40 to 75 weight percent of the copolymer (more preferably from 47 to 70 wt %).

This invention also provides compound compositions (i.e., precursor to cured/crosslinked elastomeric compositions and herein referred to as compounded composition or merely compound) comprising the above copolymers and further comprising at least one additional component selected from the group consisting of antioxidants, internal release agents, plasticizers, cure agents, accelerators, and fillers.

This invention also provides elastomeric compositions comprising the above compounded compositions that are cured (typically at elevated temperatures and elevated pressures) for sufficient time to crosslink the copolymers, and optionally post-cured (typically at elevated temperature and ambient pressure) to further cure the elastomeric compositions.

This invention also provides articles selected from the group consisting of ignition wire jacketing, hoses, dampers, seals, gaskets, spark plug boots, constant velocity joint boots and shaft boots that are formed by providing a copolymer as described above;

compounding the copolymer with at least one additional component selected from the group consisting of antioxidants, internal release agents, plasticizers, cure agents, accelerators, and fillers to form a compounded composition;

forming the composition into the desired shape; and curing the compounded composition sufficient time to crosslink the copolymer, and optionally post-curing to further cure the elastomeric composition.

A particular embodiment provides, an ethylene copolymer, for improving the low temperature range of cured compounds while maintaining high temperature and good oil resistance, derived from copolymerization of ethylene, methyl acrylate comonomer, n-butyl alkyl acrylate comonomer and optionally from 0 to 7 weight % of a monoalkyl ester of 1,4-butene-dioic acid comonomer, wherein the methyl acrylate comonomer is present in the copolymer from a lower limit of 5 weight % to an upper limit which varies linearly from 45 weight % when n-butyl acrylate is present at 41 weight % to 47.5 weight % when n-butyl acrylate is present at 15 weight % and wherein the n-butyl acrylate is present in said copolymer from a lower limit of 15 weight % when methyl acrylate is present within the range of 23 to 47.5 weight % and from a lower limit of 57 weight % when methyl acrylate is present a 5 weight % and from lower limit that varies linearly between the lower limit at 5 weight % methyl acrylate and the lower limit at 23 weight % methyl acrylate to an upper limit of 41 weight % when methyl acrylate is present at 45 weight % and to an upper limit of 80 weight % when methyl acrylate is present at 5 weight % and to an upper limit that varies linearly between 45 and 5 weight % methyl acrylate, and the remainder is ethylene.

Similarly, in a particularly preferred embodiment of the instant invention the first alkyl acrylate is methyl acrylate present in the copolymer at 10 to 40 weight % and the second alkyl acrylate is n-butyl acrylate present in the copolymer from a lower limit of 15 weight %, when methyl acrylate is present within the range of 23 to 40 weight %, and from a lower limit of 47 weight %, when methyl acrylate is present at 10 weight %, and from lower limit that varies linearly between the lower limit at 10 weight % methyl acrylate and the lower limit at 23 weight % methyl acrylate to an upper limit of 35 weight %, when methyl acrylate is present at 40 weight %, and to an upper limit of 65 weight %, when methyl acrylate is present at 10 weight %, and to an upper limit that varies linearly between 40 and 10 weight % methyl acrylate.

Even more preferred, the first alkyl acrylate is methyl acrylate present in the copolymer at 15 to 30 weight % and the second alkyl acrylate is n-butyl acrylate present in the copolymer from a lower limit 20 weight %, when methyl acrylate is present within the range of 27 to 30 weight %, and from a lower limit of 45 weight %, when methyl acrylate is present a 15 weight %, and from lower limit that varies linearly between the lower limit at 15 weight % methyl acrylate and the lower limit at 27 weight % methyl acrylate to an upper limit of 45 weight %, when methyl acrylate is present at 30 weight %, and to an upper limit of 60 weight %, when methyl acrylate is present at 15 weight %, and to an upper limit that varies linearly between 30 and 15 weight % methyl acrylate. In these particularly preferred embodiments the monoalkyl ester of 1,4-butene-dioic acid is preferably ethyl hydrogen maleate present at 2 to 5 weight % (i.e., the remainder is ethylene) resulting in the glass transition temperature, Tg, of the copolymer being from about −47° C. to about −30° C. and the oil immersion volume increase, VI, of the cured composition being equal to or less than 110% (most preferably 90% or less).

The present invention also provides blends of the novel copolymers, compounded compositions involving these copolymers and elastomeric compositions derived from curing/crosslinking the compounded compositions according to the instant invention in combination with single alkyl acrylate ethylene copolymers, compounds and elastomers including ethylene di- and terpolymers as generally known in the art (i.e., so-called AEM type materials; e.g., ethylene/methyl acrylate (E/MA), ethylene/methyl acrylate/ethyl hydrogen maleate (E/MA/EHM), and the like) as well as in combination with polyacrylate copolymers, compounds and elastomers again as generally known in the art (i.e., so-called ACM type materials; e.g., ethyl acrylate/butyl acrylate/methoxyethyl acrylate and the like).

DETAILED DESCRIPTION OF THE INVENTION

All references disclosed herein are incorporated by reference.

"Copolymer" means polymers containing two or more different monomers. The terms "terpolymer" and "tetrapolymer" mean polymers containing three and four different monomers respectively. The phrase "copolymer of various monomers" and the like means a copolymer derived from copolymerization of the various monomers.

As indicated above, this invention provides random copolymers comprising ethylene, at least two alkyl acrylates, with or without an acid cure site. The alkyl acrylates have up to 10 carbon atoms in the pendent alkyl chains, which can be branched or unbranched. For example, the alkyl groups may be selected from methyl, ethyl, n-butyl, iso-butyl, hexyl, 2-ethylhexyl, n-octyl, iso-octyl, and other alkyl groups. Thus, the alkyl acrylates used in the preparation of the terpolymers and tetrapolymers as well as higher copolymers (e.g., pentapolymers, etc.) according to the instant invention may be selected from methyl acrylate, ethyl acrylate, n-butyl acrylate, iso-butyl acrylate, hexyl acrylate, 2-ethylhexyl acrylate, n-octyl acrylate, iso-octyl acrylate, and other alkyl acrylates containing up to 10 carbon atoms in the alkyl groups. Preferably, methyl acrylate or ethyl acrylate is used as the first alkyl acrylate and the second alkyl acrylate has from 2 to 10, more preferably 4 to 8, carbon atoms in the alkyl group (when ethyl acrylate is used as the first alkyl acrylate, the second alkyl acrylate has from 3 to 10, more preferably from 4 to 8, carbon atoms in the alkyl group). Notable combinations of alkyl acrylates include combinations of methyl acrylate and a second alkyl acrylate selected from the group consisting of ethyl acrylate, n-butyl acrylate, iso-butyl acrylate, 2-ethylhexyl acrylate, and n-octyl acrylate. Methyl acrylate with n-butyl acrylate and methyl acrylate with 2-ethylhexyl acrylate are preferred combinations. Preferably, the total acrylate content comprises from about 40 to 75 weight percent of the copolymer, more preferably from about 47 to 70 weight percent.

It should be further appreciated that small amounts of other comonomers as generally known in the art can be incorporated into the copolymer provided no significant increase in the copolymer Tg results. Thus for example, it is contemplated that small amounts (a few percent) of alkyl methacrylate comonomer can be used in addition to the two different alkyl acrylates. Alternatively, an alkyl methacrylate with a low Tg can be used to substitute for the second alkyl acrylate. However, when employing the alkyl methacrylate comonomer the alkyl group for the methacrylate will preferably contain from 6 to 11 carbon atoms in order to optimize the effect that this comonomer has on the Tg.

The terpolymer of the present invention contains no cure site component, whereas the tetrapolymer and higher copolymers may contain 1,4-butene-dioic acid moieties and anhydrides and monoalkyl esters thereof, which function as acid cure sites. Of note are acid cure sites that comprise from about 0.5 to about 7 weight percent, preferably from 1 to 6 weight percent, more preferably from 2 to 5 weight percent, of a monoalkyl ester of 1,4-butene-dioic acid, in which the alkyl group of the ester has from 1 to 6 carbon atoms, in the final copolymer. The 1,4-butene-dioic acid and esters thereof exist in either cis or trans form, i.e. maleic and fumeric acid. Monoalkyl esters of either are satisfactory. Methyl hydrogen maleate, ethyl hydrogen maleate (EHM), and propyl hydrogen maleate are particularly satisfactory; most preferably EHM is to be employed.

Typically, ethylene is the fourth component of the tetrapolymer and is the third component in the terpolymer. As such, ethylene represents essentially the remainder of the copolymer relative to the required two or more different alkyl acrylates and the optional monoalkyl ester of 1,4-butene-dioic acid; i.e., polymerized ethylene is present in the copolymers in a complementary amount.

Examples of copolymers useful in this invention include copolymers of ethylene (E), methyl acrylate (MA) and n-butyl acrylate (nBA) (E/MA/nBA), copolymers of ethylene (E), methyl acrylate (MA), n-butyl acrylate (nBA) and ethyl hydrogen maleate (E/MA/nBA/EHM), copolymers of ethylene (E), methyl acrylate (MA), iso-butyl acrylate (iBA) and ethyl hydrogen maleate (E/MA/iBA/EHM), copolymers of ethylene (E), methyl acrylate (MA), 2-ethylhexyl acrylate (2-EHA) (E/MA/2-EHA), copolymers of ethylene (E), methyl acrylate (MA), 2-ethylhexyl acrylate (2-EHA) and ethyl hydrogen maleate (E/MA/2-EHA/EHM), copolymers of ethylene (E), methyl acrylate (MA) and n-octyl acrylate (nOA) (E/MA/nOA), and copolymers of ethylene (E), methyl acrylate (MA), n-octyl acrylate (nOA) and ethyl hydrogen maleate (E/MA/nOA/EHM).

Particularly notable is a copolymer comprising:
(a) from 21 to 41 weight % of ethylene comonomer;
(b) from 20 to 28 weight % of methyl acrylate comonomer;
(c) from 36 to 46 weight % of n-butyl acrylate comonomer; and
(d) from 3 to 5 weight % of a monoethyl ester of 1,4-butene-dioic acid comonomer.

Copolymers with or without acid cure sites of this invention can be readily prepared by copolymerizing ethylene and two or more different alkyl acrylates in the presence of a free-radical polymerization initiator including for example peroxygen compounds or azo compounds.

The quantities of total alkyl acrylates and the ester cure-site monomer are adjusted to provide the required amount of ($-CO_2-$) units in the final copolymer. The total ($-CO_2-$) units in the polymer are the sum of the ester groups in the two or more acrylate comonomers and in the 1,4-butene-dioic acid monoalkyl ester, and the acid groups in the monoalkyl ester. It has been found that the total ($-CO_2-$) quantity (in percentage) determines the polarity of the polymer and thus affects the oil resistance (i.e. resistance to swelling in the presence of oil). As the percentage of ($-CO_2-$) units increases, the oil swell is reduced.

In addition to affecting oil swell, each of the ($-CO_2-$) containing components will affect the glass transition temperature (Tg) with a different weighting factor. For example, methyl acrylate will increase Tg per percentage increase in weight more than the n-butyl acrylate whereas the monoalkyl ester of 1,4-butene-dioic acid will increase the Tg more than the methyl acrylate can. Of course, the amount of ethylene in the copolymer is dependent on the amounts of the polar components. Higher percentages of ethylene also contribute to lower Tg, but may do so at the expense of the desired elastomeric properties. Once the cure site monomer quantity in the copolymer is fixed based on cure chemistry required, one needs to optimize the total quantity of acrylates and the relative distribution of the two acrylates based on the final target of low temperature capability and oil resistance. As long as there is no component containing unsaturation in the polymers and the cure chemistry remains unchanged, the heat resistance remains the same.

Within the meaning of the present invention, the glass transition temperature (Tg) is measured by differential scanning calorimetry (DSC) according to ASTM method E1356-98 on devolatized polymers, and cured vulcanizates. The heat-up rate is 10° C./minute. The oil resistance is measured on the same cured vulcanizates by ASTM D471-96 and reported as the Volume Increase (corresponding to the % volume increase in the ASTM IRM 903 oil after immersion for 168 hours at 150° C. and designated hereinafter as "VI") with a plasticizer-free compound formulation. Plasticizer in elastomeric compounds tends to interfere with the volume swell data by different degrees depending on the compatibility with the oil and the exchangeability with the oil in the compound. In addition, the typically liquid plasticizer is likely to affect (i.e. lower) the compound Tg depending on the quantity used in the compound. Thus, a plasticizer-free elastomer compound is a better system for both volume swell and compound Tg comparisons.

The copolymerization can be carried out in a pressurized reactor at elevated temperature, e.g. from 90° C. to 310° C., alternatively from 90° C. to 250° C., alternatively from 145° C. to 175° C., and pressures of from 1600 to 2250 atmospheres (1650 to 2325 kg/cm$^2$), alternatively from 1800 to 2100 atmospheres (1860 to 2170 kg/cm$^2$).

The copolymerization is run as a continuous process, and ethylene, the first and second alkyl acrylates, acid cure-site monoalkyl ester monomer (if desired) and optionally a solvent such as methanol or the like (see for example U.S. Pat. No. 5,028,674) are fed continuously into a stirred autoclave of the type disclosed in U.S. Pat. No. 2,897,183, together with an initiator. The rate of addition will depend on variables such as the polymerization temperature, pressure, monomers employed, and concentration of the monomers in the reaction mixture needed to achieve the target composition of the copolymer. In some cases, it may be desirable to use a telogen (chain transfer/chain terminating agent) such as propane, to control the molecular weight. The reaction mixture is continuously removed from the autoclave. After the reaction mixture leaves the reaction vessel, the copolymer is separated from the unreacted monomers and solvent (if solvent was used) by conventional means, e.g., vaporizing the unpolymerized materials and solvent under reduced pressure and at an elevated temperature.

Selection of appropriate peroxide initiators for the copolymerization process is dependent on the reactor operating conditions, such as temperature and pressure, comonomers used, comonomer concentration, inhibitors that are typically present in commercially available comonomer. The initiator can be employed neat, diluted in a suitable solvent such as odorless mineral spirits or mixed with another different initiator. Common peroxides useful as initiators include dialkyl peroxides, peroxy esters, peroxy dicarbonates, peroxy ketals, and diacyl peroxides. Examples of suitable peroxides include di-tert-butyl peroxide, tert-butyl peroxy-2-ethylhexanoate, tert-butyl peroxypivalate, di(sec-butyl) peroxydicarbonate, tert-butyl peroxyisobutyrate, and tert-butyl peroxyacetate. These peroxides and other suitable peroxides are available under the Luperox® tradename from Atofina or the Trigonox® tradename from Akzo Nobel. Similarly, azo initiators such as 2,2'-azobisisobutyronitrile can be used.

After the continuous operation has reached a steady state, the total conversion of monomers to polymer typically varies from 5 to 30 weight percent. The melt index (M.I.) of a polymer is well recognized as being related to its molecular weight, the lower the M.I. the higher the molecular weight. The M.I. values are determined at 190° C. as described in ASTM test method D1238-01 (Procedure A, Condition 190/2.16) and these vary depending on polymerization conditions or the use of a telogen additive, typically but not limiting from about 10 to about 75 g/10 min. The percent by weight incorporation of the monoalkyl ester cure-site monomer can be measured by end-point titration using a phenolphthalein indicator (or the like) with a standardized methanolic caustic titre and a known weight of polymer dissolved in a heated xylene/butanol mixture.

The weight percent of acrylates is determined by proton nuclear magnetic resonance (NMR) or Fourier-transform infrared (FTIR) analysis, after calibration by NMR.

The copolymer made in the high-pressure autoclave often contains one to six percent by weight monomer residuals, mainly of alkyl acrylates. Removal of monomer residuals is generally known in the art as a devolatilization or finishing step. For small laboratory scale preparations, devolatilization can be accomplished by heating in a vacuum oven for a period of time (for example, heating to 140° C. with a 25-inch (635 mm) vacuum for 24 hours). For larger-scale preparations, the residuals can be removed by processing through a single or twin-screw extruder with vacuum ports at elevated temperature and the option to use a small quantity of peroxides injected into the polymer melt upstream. The peroxides used are preferably those that decompose rapidly within the range of 150 to 250° C. Examples of suitable peroxides include dicumyl peroxide, 1,1-di-(t-butylperoxy)-3,3,5-trimethylcyclohexane, 2,5-bis (t-butylperoxy)-2,5-dimethyl hexane, and α,α-bis(t-butylperoxy)-diisopropylbenzene. The peroxide may be adsorbed on an inert carrier such as calcium carbonate, carbon black or kieselguhr; however the weight of the carrier is not included in weight ranges of the peroxides described herein. The amount of peroxide injected will vary with the acrylate types, the level of the residuals, and the twin-screw extruder processing conditions. A typical range will be from 500 ppm to 8000 ppm, preferably from 1000 ppm to 5000 ppm. Residual levels in the finished copolymer are preferably below 2500 ppm, more preferably below 1500 ppm, and even more preferably below 1000 ppm. Typically in finishing the copolymer a release agent (such as R2 listed in Table B) will be added at about 0.2 to 1 weight percent in order to improve handling. Alternatively, coagents can be used in addition to the peroxide treatment. For example, from about 2000 to about 4500 ppm of trimethylolpropane triacrylate, available as Sartomer 351, can be used as a coagent.

The finished ethylene copolymers described above are typically mixed with additional materials (a process known in the art as compounding) to provide a blended composition that can be cured (a process known in the art as vulcanizing) to provide a final (elastomeric/cured) rubber compound (i.e. a vulcanizate).

The present elastomeric compositions can be compounded and cured according to the following procedures.

Compounding typically involves combining the finished polymer with added ingredients such as antioxidants, internal release agents, plasticizers, cure agents, accelerators, fillers and the like. Preferred and notable compounded compositions comprise the preferred and notable copolymers described above. The ingredients of the vulcanizable composition can be mixed in conventional equipment such as an internal mixer (e.g., a Banbury mixer), a two-roll mill and other similar mixing devices known in the art to achieve a homogeneous mixture.

After compounding, the compositions of the present invention can be vulcanized. Preferred and notable vulcanized compositions comprise the preferred and notable copolymers and compounded compositions described above. Typically a blend of the uncrosslinked (unvulcanized) copolymer and a curing agent along with various fillers and other additives is subjected to a curing step at sufficient time, temperature and pressure to achieve covalent chemical bonding (i.e., crosslinking). Vulcanization typically involves curing the compounded composition at elevated temperature and elevated pressure for sufficient time to crosslink the copolymer (often referred to as press-curing), followed by an optional post-cure heating at ambient pressure to further cure the elastomer. For example, the vulcanizate may be formed and cured using conventional procedures at about 160° C. to about 200° C. for about 2 to 60 minutes. Post-cure heating is conducted at about 160° C. to about 200° C. for one to several hours.

The compounded compositions of the present invention can be vulcanized, for example, in the presence of a peroxide curing system composed of peroxide and optionally a coagent. Suitable peroxides and coagents include essentially any such curative system as generally known in the art, including those described herein, operative at the temperature being employed during vulcanization. A preferred peroxide is α,α-bis(t-butylperoxy)-diisopropylbenzene (available from GEO Specialty Chemicals under the tradename Vul-cup®).

In a typical vulcanizate composition there will be about 0.5 to 5 parts by weight of peroxide per 100 parts of polymer (phr). Peroxide curing systems can be used with either terpolymers or tetrapolymers of this invention.

The coagent used in peroxide cure can be for example, N,N'-(m-phenylene) dimaleamide, trimethylolpropane trimethylacrylate, tetraallyloxyethane, triallyl cyanurate, tetramethylene diacrylate, or polyethylene oxide glycol dimethacrylate. A preferred coagent is N,N'-(m-phenylene) dimaleamide, available from DuPont Dow Elastomers as HVA-2. The amount of the coagent is about 0 to 5 parts by weight of coagent per 100 parts of polymer, preferably about 1 to 5 parts by weight per 100 parts of polymer. The coagents usually contain multiple unsaturated groups such as allyl or acrylic esters. While their mode of action is not known with certainty, it is thought that they react with the initial radical formed on the polymer backbone to form a more stable radical, which undergoes coupling reactions to form crosslinks more readily than chain scission reactions.

Vulcanizing or cure agents that can be used with the instant copolymers containing acid cure sites (i.e. tetrapolymers) include di- and multi-functional amine curing systems, such as hexamethylenediamine carbamate (HMDAC), tetramethylenepentamine, hexamethylenediamine-cinnamaldehyde adduct, and hexamethylenediamine dibenzoate salt. Aromatic amines can also be used as curing agents.

The vulcanization of acid cure site containing polymer can also include various vulcanization accelerators as generally known in the art. Preferably the accelerator is guanidine, an arylguanidine, an alkylguanidine or mixtures thereof. Representative accelerators include tetramethylguanidine, tetraethylguanidine diphenylguanidine and di-ortho-tolyl guanidine. The level of application of quanidine type accelerators is 1 to 6 phr of copolymer, preferably 3 to 5 phr. The preferred accelerators are diphenylguanidine and di-ortho-tolyl guanidine (DOTG) and are known to have minimum effect on compound scorch (premature curing at lower temperature) and on the heat resistance of the vulcanizates.

For example, a typical curing process uses 1.5 parts of HMDAC and 4 parts DOTG per 100 parts by weight of a copolymer containing the monoester cure-site monomer along with other ingredients being blended on a roll mill followed by a curing step for 30 minutes at 180° C. at a pressure of about 1200 psi (84 kg/cm$^2$) (see U.S. Pat. No. 3,904,588).

The vulcanizates of the present invention may contain an antioxidant system typically based on, but not limited to a phosphorus ester antioxidant, a hindered phenolic antioxidant, an amine antioxidant, or a mixture of two or more of these compounds. The proportion of the antioxidant compound in the vulcanizing composition is 0.1 to 5 parts by weight per 100 parts of polymer, preferably about 0.5 to 2.5 parts by weight per 100 parts of polymer. The antioxidant improves the heat aging of the compositions. The antioxidant effect is usually quite low below the preferred range and impractically low below the lower limit of the broad range. Above the higher limits, little additional improvement is observed, and there may be adverse effects on the state of the cure. The weight ratio of the phenolic or amine antioxidant to the phosphorus compound in mixtures is about 0.5 to 3, and preferably the ratio is about 1.

The phosphorus ester can be for example, tri(mixed mono-and dinonylphenyl) phosphite, tris(3,5-di-t-butyl-4-hydroxyphenyl phosphate, high molecular weight poly(phenolic phosphonates), and 6-(3,5-di-t-butyl-4-hydroxy)benzyl-6H-dibenz-[c,c][1,2]oxaphosphorin-6-oxide.

Suitable hindered phenolic antioxidants can be, for example 4,4'-butylidenebis(6-t-butyl-m-cresol), 1,3,5-trimethyl-2,4,6-tris-(3,5-di-t-butyl-4-hydroxybenzyl)benzene, 2,6-di-t-butyl-α-dimethylamino-p-cresol and 4,4'-thiobis-(3-methyl-6-t-butylphenol).

Amine antioxidants include, for example, polymerized 2,2,4-trimethyl-1,2-dehydroquinoline; N-phenyl-N'-(p-toluenesulfonyl)-p-phenylenediamine, N,N'-di(β-naphthyl)-p-phenylenediamine, low temperature reaction product of phenyl (β-naphthyl) amine and acetone, and 4,4'-bis(α,α-dimethylbenzyl)diphenylamine.

Preferred antioxidant compositions contain tri(mixed mono-and dinonylphenyl) phosphite mixed with either 4,4'-butylidenebis(6-t-butyl-m-cresol) or 4,4'-bis(α,α-dimethylbenzyl)diphenylamine. Particularly preferred antioxidant compositions contain 4,4'-bis(α,α-dimethylbenzyl)-diphenylamine (available commercially as Naugard® 445 from Uniroyal Chemical Company).

It is often desirable to add fillers to reduce cost and to improve mechanical properties. A typical vulcanized composition will contain from 15 to 60 volume percent of fillers, alternatively from 30 to 200 parts of filler per hundred (phr) parts of polymer. Suitable fillers include, for example but not way of limitation, carbon black, calcium carbonate, magnesium silicate or silica. A filler of note is carbon black. The preferred proportion of fillers is from 20 up to 45 volume percent, alternatively from 50 to 120 parts of filler per hundred parts of polymer (phr). The preferred proportion also depends on the reinforcing effect of the filler used. Particle size of the filler employed can also influence the reinforcing effect of the filler.

The vulcanizates of the copolymers (terpolymer, tetrapolymers, and higher) of this invention exhibit an oil swell of less than 110%, preferably less than 90%; a Tg less than −25° C., preferably less than −30° C., and more preferably less than −35° C.; and excellent heat aging resistance. This extended low temperature capability permits the use of this invention in automotive applications such as constant velocity joint (CVJ) boots and shaft boots where a (plasticized) vulcanizate Tg of lower than −45° C. is often required and which is difficult to achieve with current ethylene copolymers comprising a single alkyl acrylate with typical plasticizer loadings (e.g. 10 phr after heat aging). At higher plasticizer loadings, lower than −40° C. Tg values of the vulcanizates from single acrylate copolymer can be achieved, but the processability of the resulting compositions and the heat aging of the vulcanizates are adversely affected.

The vulcanizates of the copolymers of the present invention can be used in a wide variety of industrial applications, including ignition wire jacketing, spark plug boots, hoses, belts, miscellaneous molded boots, seals and gaskets. Hose applications include turbo diesel air cooler hoses, transmission oil cooler hoses, power steering hoses (low pressure), air conditioning hoses, air ducts, fuel line cover, and vent hoses. Automotive tubing applications include axle vent tubing, PCV tubing and other emission control parts. The vulcanizates are also useful for crankshaft torsional dampers where high damping over a broad temperature range is needed under high compressive and shear strains. The vulcanizates also can be used for noise management parts such as grommets.

The lower Tg copolymer from this invention can also be used in blends with existing copolymers derived from a single alkyl acrylate (e.g. ethylene/methyl acrylate/acid cure-site) as well as with polyacrylates (e.g. ethyl acrylate/butyl acrylate/methoxyethyl acrylate, ethyl acrylate/butyl acrylate/butenedioic acid monoalkyl ester and the like) to lower the temperature capability for applications such as hoses, dampers, seals and gaskets for improved low temperature range performance.

Once cross-linked, the compositions described herein are not thermoplastic, per se, so articles prepared according to this invention must be formed into the desired shape by molding or extrusion procedures and concurrently or subsequently cured.

The articles described above can be prepared from the compositions of this invention by compounding the copolymer with added ingredients such as antioxidants, internal release agents, plasticizers, cure agents, accelerators, fillers and the like and forming the composition into the desired shape by, for example, injection molding, compression molding or transfer molding. The compositions are held in the molds at elevated temperature and pressure for a period of time to initiate crosslinking (i.e. curing) and the shaped compositions are then removed from the molds and heated further (i.e. post-curing) to complete the curing.

In some cases (e.g. hoses), the compounded composition as described above can be formed into a shaped article by extrusion through an appropriately designed die. The initially-shaped article can be further shaped by forming with a mandrel while still plastic prior to curing. Typically hoses and tubing are cured by treatment with super heated steam to provide the necessary heat and pressure.

Some articles may comprise reinforcing elements in addition to the compositions of this invention. For example, articles (e.g. gaskets) may be prepared in which the composition of this invention is molded around a metal insert element. Other articles (e.g. hoses) can be extruded with reinforcing threads or cording incorporated therein.

While the invention has been particularly shown and described with reference to the preferred embodiments thereof, it will be understood by those skilled in the art that various changes in form and details may be made without departing from the spirit and scope of the invention.

EXAMPLES

The following Examples are merely illustrative, and are not to be construed as limiting the scope of the invention described and/or claimed herein.

The copolymerization can be carried out in a pressurized reactor at temperatures from 90° C. to 310° C., alternatively from 90° C. to 250° C., alternatively from 145° C. to 175° C., and pressures of from 1600 to 2250 atmospheres (1650 to 2325 kg/cm$^2$), alternatively from 1800 to 2100 atmospheres (1860 to 2170 kg/cm$^2$).

For example, a copolymer of this invention is produced in a high pressure autoclave reactor at a reactor temperature of 165° C. and pressure of 2040 atmospheres (2108 kg/cm$^2$), with an ethylene feed rate of 15.0 lb/h (6.8 kg/h), a methyl acrylate feed rate of 2.5 lb/h, an n-butyl acrylate feed rate of 2.5 lb/h (1.1 kg/h), an EHM feed rate of 0.2 lb/hr (90 g/h) and a methanol solvent feed rate of 0.2 lb/hr (90 g/h). Luperox® 225 (from Atofina) initiator was used, diluted to 10 volume % in odorless mineral spirits.

This process provided the base polymeric resin, Resin A, at a rate of 4.5 lb/h (2 kg/h) for about 100 lbs (45 kg) total in an overall conversion of 22.4 weight %, and had a melt index (M.I.) of 14.8. Resin A contained 3.9 weight % of EHM (measured by titration) and 3950 ppm of methyl acrylate and 19200 ppm of n-butyl acrylate residual; i.e., free comonomers (measured by gas chromatograph headspace analysis). Percentages of comonomers incorporated in the copolymer examples (determined by proton NMR before devolatilization) are indicated in Table 1 below.

A portion of Resin A was devolatilized by heating in a vacuum oven to 140° C. with a 25-inch (635 mm) vacuum for 24 hours to provide a dried polymer, Example 6 of Table 1, for Tg measurement.

A 90 lb (41 kg) portion of the Resin A obtained in the initial copolymerization step was also devolatilized using both peroxide scavenging and gas-assisted stripping. About 15 lb (6.8 kg) of Resin B (Example 5 of Table 1), obtained in a separate copolymerization run under similar conditions, containing 5900 methyl acrylate and 33200 ppm of n-butyl acrylate, was divided into small portions and mixed with the bulk of Resin A as it was fed into the extruder. The crude material was passed through a 40 Length/Diameter (L/D) 25 mm twin-screw extruder (a suitable extruder is available from Berstorff GmbH, Hanover Germany) fitted with a 2-inch (5 cm) single-screw melt feeder, injector ports at 12 L/D and 22 L/D and vacuum vents at 7 L/D, 17 L/D and 33 L/D along the length of the extruder. The feed rate was between 170 and 185 grams per minute. A 15 weight % solution of 1,1-di-(t-butylperoxy)-3,3,5-trimethylcyclohexane (available from Atofina as Luperox® 231) in methanol was injected at 12 L/D, so the vent zone immediately after experienced a stripping effect (from the methanol) as well as a scavenging effect from the peroxide. Water, at a rate corresponding to 1.5 weight percent, was injected at 22 L/D, which also provided a stripping effect. The screw speed was kept at about 200 rpm. The devolatilized compositions were sampled at 30-minute intervals to determine the methyl acrylate and n-butyl acrylate monomer residuals and the results are summarized in Table A. The devolatilized, or finished, polymer is Example 7 of Table 1.

Abbreviations used in the Tables below include: "E" stands for ethylene, "MA" stands for methyl acrylate, "nBA" stands for n-butyl acrylate, "iBA" stands for isobutyl acrylate, "2-EHA" stands for 2-ethylhexyl acrylate, "nOA" stands for n-octyl acrylate, "EHM" stands for ethyl hydrogen maleate, "Tg" stands for glass transition temperature, "VI" stands for volume increase of the cured composition after oil immersion, and "- -" stands for no data. Tg was determined on devolatilized samples (by vacuum oven drying for lab scale samples, as described previously). Amounts of comonomers in the final copolymer are indicated in weight percent, unless indicated otherwise.

TABLE A

| Feed rate (g/min) | Peroxide (ppm) | MA* (ppm) | nBA* (ppm) | MI |
|---|---|---|---|---|
| 178 | 2460 | 49 | 1248 | 13.5 |
| 172 | 2540 | 66 | 1917 | 11.6 |
| 175 | 2510 | 61 | 1634 | 11.2 |
| 173 | 2530 | 70 | 1732 | 10.4 |
| 172 | 2550 | 83 | 1790 | 12.6 |
| 176 | 2480 | 98 | 2382 | 12.0 |
| 181 | 2430 | 90 | 1814 | 10.3 |
| 177 | 2470 | 71 | 1640 | 12.0 |
| 181 | 2420 | 74 | 1723 | 12.2 |
| Lot Averages | | 74 | 1764 | 11.7 |

*extracted and measured by gas chromatograph

In the finishing operation, screw size and design will impact the amount of copolymer that can be processed and will in turn impact the selection of the appropriate processing variables, including for example screw speed, residence time, temperature and peroxide amounts. One skilled in the art can design the appropriate processing variables to achieve a balance among these variables necessary for preparation of suitable finished compositions. Adjusting processing variables can impact the levels of residual monomers present in the final finished composition. In particular, levels of residual monomers lower than the amounts illustrated in Table A can be achieved by appropriate processing parameters and adjusting levels of peroxide and coagent.

Other examples with different monomer(s) and/or amounts in the final composition are prepared as described above, by changing the monomers employed and concentration of the monomers in the reaction mixture and varying polymerization temperature and pressure in the reactor. They were devolatilized in a vacuum oven as described for Example 6. Weight % of the EHM is determined by titration and the weight % of the other comonomers incorporated in the copolymer is determined by NMR analysis, after normalizing for the residual monomer and titrated EHM content.

TABLE 1

Example Polymer Composition, Tg, and Vulcanizate Volume Increase (VI)

| Example | Wt. % E | Wt. % MA | Wt. % | Wt. % EHM | Tg (° C.)[1] | VI (%)[2] |
|---|---|---|---|---|---|---|
| | | | nBA | | | |
| C1 | 41.8 | 53.7 | 0 | 4.5 | −30.2 | 55.9 |
| C2 | 37.4 | 62.6 | 0 | 0 | −28.1 | 40.2 |
| 3 | 37.3 | 29.1 | 30.0 | 3.6 | −38.7 | 77.3 |
| 4 | 36.6 | 30.7 | 28.5 | 4.2 | −37.1 | 73.4 |
| 5 | 26.5* | 34.6* | 34.6* | 4.2 | −32.5 | 60** |
| 6 | 28.2* | 34.0* | 34.0* | 3.9 | −32.6 | 62** |
| 7 | 27.2 | 33.8 | 35.0 | 4.0 | −36.1 | 55.1 |
| 8 | 27.2 | 24.5 | 44.6 | 3.7 | −38.6 | 67.7 |
| 9 | 24.0 | 30.6 | 43.6 | 1.9 | −35.9 | 74.1 |
| 10 | 30.5 | 28.1 | 38.6 | 2.9 | −39.7 | 83.8 |
| 11 | 30.4 | 27.3 | 36.9 | 5.4 | −37.1 | 66.5 |
| 12 | 21.0 | 30.2 | 43.2 | 5.7 | −31.8 | 46.3 |
| 13 | 33.0 | 36.8 | 28.3 | 2.0 | −35.7 | 72.8 |
| 14 | 25.1 | 40.5 | 32.1 | 2.3 | −30.6 | 56.6 |
| 15 | 23.1 | 39.4 | 31.8 | 5.7 | −26.8 | 37.4 |
| 16 | 30.2 | 36.3 | 28.0 | 5.5 | −30.4 | 53.3 |
| 17 | 29.3 | 41.9 | 25.1 | 3.7 | −29.8 | 44.2 |
| 18 | 36.7 | 29.6 | 30.0 | 3.7 | −39.2 | 75.7 |
| 19 | 26.8 | 34.0 | 35.5 | 3.7 | −34.7 | 59.7 |

TABLE 1-continued

Example Polymer Composition, Tg, and Vulcanizate Volume Increase (VI)

| Example | Wt. % E | Wt. % MA | Wt. % | Wt. % EHM | Tg (° C.)[1] | VI (%)[2] |
|---|---|---|---|---|---|---|
| 20 | 30.6 | 32.1 | 32.9 | 4.4 | −35.8 | 70.0 |
| 21 | 21.6 | 35.9 | 38.8 | 3.7 | −33.5 | 46.7 |
| 22 | 29.9 | 25.4 | 40.8 | 3.9 | −40.6 | 79.4 |
| 23 | 32.8 | 31.0 | 32.2 | 4.0 | −38.3 | 71.9 |
| 24 | 29.4* | 22.5* | 44.3* | 3.8 | −42.3 | 83.4 |
| 25 | 25.6 | 44.3 | 30.2 | 0 | −33.0 | 51.4 |
| 26 | 25.5 | 50.7 | 23.9 | 0 | −28.3 | 42.3 |
| 27 | 24.1 | 29.5 | 42.5 | 4.0 | −36.7 | 60.4 |
| | | | iBA | | | |
| 28 | 29.0* | 33.7* | 33.7* | 3.7 | −31.0 | 61.3 |
| | | | 2-EHA | | | |
| 29 | 30.7 | 38.4 | 26.9 | 4.0 | −37.2 | 75.0 |
| 30 | 30.9 | 31.8 | 33.4 | 3.9 | −40.5 | 89.2 |
| 31 | 20.2* | 55.1* | 24.7* | 0 | −32.0 | 57.1 |
| | | | nOA | | | |
| 32 | 23.6 | 46.8 | 29.6 | 0 | −33.8 | 63.6 |

[1]measured on devolatized copolymers
[2]measured on cured compound compositions
*estimated based on monomer feed rates and conversion data
**predicted based on estimated copolymer composition Certain compositions of Table 1 were blended with additional components including cure agents, accelerators, fillers, release aids, antioxidants and plasticizers (see Table B below) according to the following general procedure.

The respective starting ingredients were blended on a B or OOC size Banbury mixer using an upside-down mixing procedure and a dump temperature of 100° C. followed by further mixing on a two-roll mill at about 25° C. to achieve a homogeneous mixture. Vulcanized slabs of 75 mils (0.075 inch or 1.9 mm) thick were prepared by curing the compounded composition for 5 to 10 minutes at 177° C. (or 180° C.) at a pressure of about 600 psig. The vulcanizates were then post-cured at 175° C. for one to four hours at ambient pressure. The slabs were cut into test coupons for material property testing.

TABLE B

| | Material | Trade Name | Supplier |
|---|---|---|---|
| Release Aids | | | |
| R1 | Octadecyl Amine | Armeen ® 18D | Akzo Nobel |
| R2 | Complex Organic Phosphate Ester | Vanfre ® VAM | R. T. Vanderbilt |
| R3 | Stearic Acid | | |
| Anti-oxidants | | | |
| A1 | 4,4'-bis(α,α-dimethylbenzyl)-diphenylamine | Naugard ® 445 | Uniroyal Chemical |
| Plasticizers | | | |
| P1 | Mixed Ether/Ester Plasticizer | TP ®-759 | Rohm & Haas |
| P2 | Di-(2-ethylhexyl) sebacate (Dioctyl sebacate or DOS) | | |
| Fillers | | | |
| F1 | Carbon Black (FEF N-550) | | |
| F2 | Carbon Black (SRF N-774) | | |
| F3 | Fumed silica | Cab-O-Sil ® M7D | Cabot Corporation |

TABLE B-continued

| | Material | Trade Name | Supplier |
|---|---|---|---|
| Curative System | | | |
| CA1 | Hexamethylene Diamine Carbamate | Diak™ #1 | DuPontDow Elastomers |
| CA2 | Di-ortho-tolyl Guanidine (DOTG) | | |
| CA3 | Bis (t-butylperoxy) diisopropylbenzene peroxide | Vul-cup® 40 KE | GEO Specialty Chemicals |
| CA4 | N,N'-(m-phenylene) dimaleamide | HVA-2® | DuPont Dow Elastomers |

Amounts of components in the tables hereafter are provided in parts per hundred (phr) of polymer. Comparative Example C1 is a commercial grade of a random copolymer containing acid cure site comprising: ethylene, a single alkyl acrylate (i.e. methyl acrylate) and ethyl hydrogen maleate and is sold under the tradename Vamac® G by E. I. du Pont de Nemours and Company.

Comparative Example C2 is a commercial grade of a random copolymer without acid cure sites (i.e., a dipolymer) comprising: ethylene and a single alkyl acrylate (i.e. methyl acrylate) sold under the tradename Vamac® DP by E. I. du Pont de Nemours and Company.

TABLE 2

Low Tg Compounds without Plasticizers

| Example Component | C101 (phr) | 102 (phr) | 103 (phr) | C104 (phr) | 105 (phr) | C106 (phr) | 107 (phr) | 108 (phr) |
|---|---|---|---|---|---|---|---|---|
| Ex. C1 | 100 | — | — | 100.5 | — | 100.5 | — | — |
| Ex. 3 | — | 100 | — | — | — | — | — | — |
| Ex. 4 | — | — | 100 | — | — | — | — | — |
| Ex. 24 | — | — | — | — | 100 | — | — | — |
| Ex. 8 | — | — | — | — | — | — | 100 | — |
| Ex. 9 | — | — | — | — | — | — | — | 100 |
| A1 | 2 | 2 | 2 | 2 | 2 | 2 | 2 | 2 |
| R1 | 0.5 | 0.5 | 0.5 | 0.5 | 0.5 | 0.5 | 0.5 | 0.5 |
| R2 | 1 | 1 | 1 | 1 | 1.5 | 1 | 1.5 | 1.5 |
| R3 | 1.5 | 1.5 | 1.5 | 1.5 | 1.5 | 1.5 | 1.5 | 1.5 |
| F1 | 60 | 60 | 60 | — | — | — | — | — |
| F2 | — | — | — | 80 | 80 | 80 | 80 | 80 |
| CA1 | 1.5 | 1.5 | 1.5 | 1.5 | 1.5 | 1.5 | 1.5 | 1.5 |
| CA2 | 4 | 4 | 4 | 4 | 4 | 4 | 4 | 4 |
| Total, phr | 170.5 | 170.5 | 170.5 | 191 | 191 | 191 | 191 | 191 |

TABLE 3

Properties of Low Tg Compounds without Plasticizers
Rheology of Compounds

| Example | C101 | 102 | 103 | C104 | 105 | C106 | 107 | 108 |
|---|---|---|---|---|---|---|---|---|
| Mooney Viscosity | | | | | | | | |
| ML(1 + 4) at 100° C. | 62.1 | 92.2 | 102.7 | 53.5 | 29.6 | 54.3 | 33.2 | 28.8 |
| Mooney Scorch - 121° C. | | | | | | | | |
| Minimum Viscosity - MU | 21.9 | 46.4 | 51.6 | 17.8 | 13.5 | 18.4 | 13.0 | 10.7 |
| t3 - metric minutes | 6.39 | 3.06 | 3.29 | 6.19 | 5.27 | 6.48 | 5.83 | 18.72 |
| t10 - metric minutes | 10.05 | 4.85 | 6.07 | 9.98 | 15.69 | 10.37 | 10.55 | >20 |
| t18 - metric minutes | 14.05 | 11.41 | >20 | 13.08 | >20 | 13.90 | >20 | >20 |
| MDR summary at 177, 1° arc | | | | | | | | |
| ML, lbf-in | 0.89 | 1.96 | 2.47 | 0.79 | 0.69 | 0.76 | 0.68 | 0.70 |
| MH, lbf-in | 28.87 | 20.67 | 21.10 | 29.32 | 14.10 | 28.37 | 19.55 | 10.58 |
| ts2, metric minutes | 0.74 | 0.87 | 0.92 | 0.71 | 1.33 | 0.76 | 0.96 | 2.56 |
| $t_c50$, metric minutes | 2.40 | 3.48 | 3.90 | 2.31 | 4.88 | 2.44 | 4.01 | 6.61 |
| $t_c90$, metric minutes | 8.74 | 16.14 | 17.42 | 9.19 | 20.01 | 9.69 | 18.25 | 20.14 |

TABLE 3-continued

Properties of Low Tg Compounds without Plasticizers
Rheology of Compounds

| Example | C101 | 102 | 103 | C104 | 105 | C106 | 107 | 108 |
|---|---|---|---|---|---|---|---|---|
| Physical Properties after Cure Press cure at 177° C. for 5 minutes; Post cure at 175° C. for 4 hours | | | | | | | | |
| Stress-Strain and Hardness, Original at 23° C. | | | | | | | | |
| Hardness, Shore A, points | 70.9 | 63.8 | 65.5 | 68.2 | 64.7 | 71.6 | 70.1 | 66.0 |
| Modulus at 100% Elongation, psi | 1126 | 871 | 950 | 1301 | 792 | 1160 | 991 | 626 |
| Tensile Strength at break, psi | 2532 | 2136 | 2051 | 2682 | 1945 | 2468 | 2050 | 1837 |
| % Elongation | 233 | 219 | 201 | 210 | 207 | 237 | 197 | 281 |
| Tear, Die C, pli (pounds per linear inch) | 215 | 163 | 167 | 177 | 136 | 189 | 141 | 164 |
| Tg by DSC, ° C. | −27.4 | −38.1 | −36.6 | −26.6 | −41.1 | −27.9 | −39.2 | −34.5 |
| Brittle Point, ° C. (ASTM 02137-94) | — | — | — | −27 | −37 | −32 | −37 | −37 |
| Compression set, ASTM D395-89, method B, plied | | | | | | | | |
| 70 hrs/150° C. | 12.8 | 17.4 | 20.6 | 15.2 | 27.2 | — | — | — |
| 168 hrs/150° C. | 19.1 | 21.6 | 27.7 | 20.7 | 42.6 | 19.1 | 33.0 | 45.9 |
| Age 1 week at 150° C. in air | | | | | | | | |
| Hardness, Shore A, points | 71.7 | 65.6 | 67.0 | 70.1 | 65.3 | 71.5 | 69.2 | 69.4 |
| Modulus at 100% elongation, psi | 1167 | 893 | 906 | 1387 | 985 | 1249 | 1154 | 693 |
| Tensile strength at break, psi | 2510 | 2117 | 2041 | 2820 | 2013 | 2621 | 2095 | 1730 |
| % Elongation at break | 261 | 224 | 228 | 214 | 184 | 224 | 182 | 269 |
| Tg by DSC, ° C. | −27.7 | −38.4 | −36.8 | −26.0 | −41.1 | −26.6 | −37.9 | −35.0 |
| Change in Hardness, points | 0.8 | 1.8 | 1.5 | 1.9 | 0.6 | −0.1 | −0.9 | 3.4 |
| % change in 100% modulus | 3.6 | 2.5 | −4.6 | 6.6 | 24.4 | 7.7 | 16.4 | 10.7 |
| % change in tensile | −0.9 | −0.9 | −0.5 | 5.1 | 3.5 | 6.2 | 2.2 | −5.8 |
| % change in elongation | 12.0 | 2.3 | 13.4 | 1.9 | −11.1 | −5.5 | −7.6 | −4.3 |
| Age 3 weeks at 150° C. in air | | | | | | | | |
| Hardness, Shore A, points | 72.4 | 64.1 | 68.2 | 71.9 | 65.5 | 70.2 | 70.9 | 67.3 |
| Modulus at 100% elongation, psi | 1145 | 841 | 925 | 1384 | 926 | 1262 | 1079 | 641 |
| Tensile strength at break, psi | 2300 | 1998 | 1966 | 2642 | 1865 | 2455 | 1886 | 1598 |
| % Elongation at break | 222 | 227 | 223 | 200 | 183 | 202 | 180 | 267 |
| Tg by DSC, ° C. | −28.0 | −38.9 | −36.9 | −27.2 | −40.6 | −27.8 | −38.6 | −36.5 |
| Change in Hardness, points | 1.5 | 0.3 | 2.7 | 3.7 | 0.8 | −1.4 | 0.8 | 1.3 |
| % change in 100% modulus | 1.7 | −3.4 | −2.6 | 6.4 | 16.9 | 8.8 | 8.9 | 2.4 |
| % change in tensile | −9.2 | −6.5 | −4.1 | −1.5 | −4.1 | −0.5 | −8.0 | −13.0 |
| % change in elongation | −4.7 | 3.7 | 10.9 | −4.8 | −11.6 | −14.8 | −8.6 | −5.0 |
| Age 6 weeks at 150° C. in air | | | | | | | | |
| Hardness, Shore A, points | 72.3 | 66.2 | 68.1 | 74.4 | 67.8 | 72.8 | 71.1 | 66.6 |
| Modulus at 100% elongation, psi | 1118 | 834 | 879 | 1494 | 927 | 1264 | 1082 | 586 |
| Tensile strength at break, psi | 2179 | 1894 | 1787 | 2518 | 1720 | 2365 | 1783 | 1467 |
| % Elongation at break | 237 | 240 | 221 | 183 | 181 | 210 | 176 | 274 |
| Tg by DSC, ° C. | −27.8 | −37.9 | −36.9 | −25.2 | −39.8 | −27.9 | −38.5 | −36.2 |
| Change in Hardness, points | 1.4 | 2.4 | 2.6 | 6.2 | 3.1 | 1.2 | 1.0 | 0.6 |
| % change in 100% modulus | −0.7 | −4.2 | −7.5 | 14.8 | 17.0 | 9.0 | 9.2 | −6.4 |
| % change in tensile | −13.9 | −11.3 | −12.9 | −6.1 | −11.6 | −4.2 | −13.0 | −20.1 |
| % change in elongation | 1.7 | 9.6 | 10.0 | −12.9 | −12.6 | −11.4 | −10.7 | −2.5 |
| Age 1 week at 150° C. in IRM 903 oil | | | | | | | | |
| Hardness, Shore A, points | 51.5 | 45.9 | 46.1 | 52.5 | 42.0 | 48.4 | 47.9 | 35.6 |
| Modulus at 100% elongation, psi | 1085 | 978 | 1027 | 1162 | — | 1127 | — | 555 |
| Tensile strength at break, psi | 1944 | 1057 | 1223 | 1771 | 857 | 1744 | 1032 | 1034 |
| % Elongation at break | 173 | 106 | 114 | 145 | 95 | 148 | 92 | 159 |
| Change in Hardness, points | −19.4 | −17.9 | −19.4 | −15.7 | −22.7 | −23.2 | −22.2 | −30.4 |
| % change in 100% modulus | −3.6 | 12.3 | 8.1 | −10.7 | — | −2.8 | — | −11.3 |
| % change in tensile | −23.2 | −50.5 | −40.4 | −34.0 | −55.9 | −29.3 | −49.7 | −43.7 |
| % change in elongation | −25.8 | −51.6 | −43.3 | −31.0 | −54.1 | −37.6 | −53.3 | −43.4 |
| % change in volume | 53.5 | 77.3 | 73.4 | 49.7 | 83.4 | 55.4 | 67.7 | 74.1 |
| % change in weight | 39.6 | 57.4 | 54.2 | 35.3 | 59.3 | 40.0 | 48.1 | 52.4 |

TABLE 4

Low Tg Compounds with Plasticizers

| Example Component | C201 (phr) | 202 (phr) | C203 (phr) | 204 (phr) | C205 (phr) | 206 (phr) |
|---|---|---|---|---|---|---|
| Ex. C1 | 100 | — | 100 | — | 100 | — |
| Ex. 3 | — | 100 | — | 100 | — | 100 |
| A1 | 2 | 2 | 2 | 2 | 2 | 2 |
| R1 | 0.5 | 0.5 | 0.5 | 0.5 | 0.5 | 0.5 |
| R2 | 1 | 1 | 1 | 1 | 1 | 1 |
| R3 | 1.5 | 1.5 | 1.5 | 1.5 | 1.5 | 1.5 |
| F1 | 60 | 60 | 90 | 90 | 90 | 90 |
| P1 | 10 | 10 | 35 | 35 | — | — |
| P2 | — | — | — | — | 35 | 35 |
| CA1 | 1.5 | 1.5 | 1.5 | 1.5 | 1.5 | 1.5 |
| CA2 | 4 | 4 | 4 | 4 | 4 | 4 |
| Total, phr | 180.5 | 180.5 | 235.5 | 235.5 | 235.5 | 235.5 |

TABLE 5

Properties of Low Tg Compounds with Plasticizers
Rheology of Compounds

| Example | C201 | 202 | C203 | 204 | C205 | 206 |
|---|---|---|---|---|---|---|
| Mooney Viscosity | | | | | | |
| ML(1 + 4) at 100° C. | 38.5 | 66.7 | 25.1 | 38.7 | 23.5 | 27.2 |
| Mooney Scorch - 121° C. | | | | | | |
| Minimum Viscosity - MU | 13.5 | 35.7 | 8.9 | 20.6 | 7.8 | 12.2 |
| t3 - metric minutes | 7.16 | 3.97 | 6.81 | 12.52 | 7.67 | 5.08 |
| t10 - metric minutes | 12.11 | 10.76 | 14.16 | >20 | 14.18 | 18.36 |
| t18 - metric minutes | 19.65 | 18.20 | >20 | >20 | >20 | >20 |
| MDR summary at 177° C., 1° arc | | | | | | |
| ML, lbf-in | 0.55 | 1.47 | 0.60 | 1.21 | 0.49 | 0.76 |
| MH, lbf-in | 21.96 | 16.32 | 15.72 | 12.94 | 19.04 | 14.03 |
| ts2, metric minutes | 0.87 | 1.02 | 1.04 | 1.36 | 1.00 | 1.20 |
| $t_c50$, metric minutes | 2.48 | 3.43 | 2.60 | 3.94 | 2.85 | 3.96 |
| $t_c90$, metric minutes | 8.54 | 15.71 | 10.76 | 16.90 | 11.08 | 17.49 |
| Physical Properties after Cure Press cure at 177° C. for 5 minutes; Post cure at 175° C. for 4 hours | | | | | | |
| Stress-Strain and Hardness, Original at 23° C. | | | | | | |
| Hardness, Shore A, points | 64.2 | 59.7 | 62.6 | 52.0 | 57.0 | 60.0 |
| Modulus at 100% Elongation, psi | 747 | 603 | 695 | 529 | 725 | 667 |
| Tensile Strength at break, psi | 1992 | 1721 | 1799 | 1590 | 1920 | 1611 |
| % Elongation at break | 247 | 238 | 240 | 219 | 217 | 204 |
| Tear, Die C, pli | 200 | 145 | 142 | 115 | 132 | 106 |
| Tg by DSC, ° C. | −35.3 | −43.8 | −49.8 | −56.5 | −52.3 | −61.7 |
| Brittle Point, ° C. (ASTM D2137-94) | — | — | −47 | −53 | −52 | −60 |
| Compression set, ASTM D395-89 method B, plied | | | | | | |
| 168 hrs/150° C., % | 21.9 | 23.8 | 32.5 | 36.0 | 37.3 | 40.2 |
| Age 1 week at 150° C. in air | | | | | | |
| Hardness, Shore A, points | 65.3 | 59.2 | 67.7 | 58.9 | 84.2 | 82.3 |
| Modulus at 100% elongation, psi | 764 | 578 | 713 | 554 | 1407 | 1159 |
| Tensile strength at break, psi | 2236 | 1670 | 1618 | 1455 | 2082 | 1709 |
| % Elongation at break | 306 | 243 | 247 | 234 | 207 | 196 |
| Tg by DSC, ° C. | −34.2 | −44.1 | −44.8 | −52.8 | −29.7 | −38.8 |
| Change in Hardness, points | 1.1 | −0.5 | 5.1 | 6.9 | 27.2 | 22.3 |
| % change in 100% modulus | 2.3 | −4.1 | 2.6 | 4.7 | 94.1 | 73.8 |
| % change in tensile | 12.2 | −3.0 | −10.1 | −8.5 | 8.4 | 6.1 |
| % change in elongation | 23.9 | 2.1 | 2.9 | 6.8 | −4.6 | −3.9 |
| Age 3 week at 150° C. in air | | | | | | |
| Hardness, Shore A, points | 71.6 | 60.8 | 72.6 | 65.9 | 85.7 | 83.3 |
| Modulus at 100% elongation, psi | 831 | 598 | 902 | 791 | 1486 | 1224 |

TABLE 5-continued

Properties of Low Tg Compounds with Plasticizers
Rheology of Compounds

| Example | C201 | 202 | C203 | 204 | C205 | 206 |
|---|---|---|---|---|---|---|
| Tensile strength at break, psi | 2060 | 1660 | 1441 | 1291 | 2001 | 1648 |
| % Elongation at break | 317 | 261 | 230 | 205 | 200 | 179 |
| Tg by DSC, ° C. | −31.5 | −41.5 | −41.6 | −48.9 | −27.3 | −38.1 |
| Change in Hardness, points | 7.4 | 1.1 | 10.0 | 13.9 | 28.7 | 23.3 |
| % change in 100% modulus | 11.2 | −0.8 | 29.8 | 49.5 | 105.0 | 83.5 |
| % change in tensile | 3.4 | −3.5 | −19.9 | −18.8 | 4.2 | 2.3 |
| % change in elongation | 28.3 | 9.7 | −4.2 | −6.4 | −7.8 | −12.3 |
| Age 6 weeks at 150° C. in air | | | | | | |
| Hardness, Shore A, points | 70.6 | 61.0 | 83.0 | 77.3 | 86.7 | 83.1 |
| Modulus at 100% elongation, psi | 928 | 579 | 1219 | 982 | 1556 | 1302 |
| Tensile strength at break, psi | 1958 | 1500 | 1451 | 1311 | 1834 | 1596 |
| % Elongation at break | 263 | 248 | 164 | 183 | 156 | 161 |
| Tg by DSC, ° C. | −30.5 | −40.6 | −35.0 | −43.8 | −28.1 | −37.3 |
| Change in Hardness, points | 6.4 | 1.3 | 20.4 | 25.3 | 29.7 | 23.1 |
| % change in 100% modulus | 24.2 | −4.0 | 75.4 | 85.6 | 114.6 | 95.2 |
| % change in tensile | −1.7 | −12.8 | −19.3 | −17.5 | −4.5 | −0.9 |
| % change in elongation | 6.5 | 4.2 | −31.7 | −16.4 | −28.1 | −21.1 |
| Age 1 week at 150° C. in IRM 903 oil | | | | | | |
| Hardness, Shore A, points | 48.1 | 39.4 | 46.7 | 35.9 | 48.6 | 39.6 |
| Modulus at 100% elongation, psi | 818 | 719 | 700 | 695 | 840 | 722 |
| Tensile strength at break, psi | 1686 | 813 | 1639 | 979 | 1595 | 957 |
| % Elongation at break | 189 | 112 | 197 | 128 | 164 | 123 |
| Change in Hardness, points | −16.1 | −20.3 | −15.9 | −16.1 | −8.4 | −20.4 |
| % change in 100% modulus | 9.5 | 19.2 | 0.7 | 31.4 | 15.9 | 8.2 |
| % change in tensile | −15.4 | −52.8 | −8.9 | −38.4 | −16.9 | −40.6 |
| % change in elongation | −23.5 | −52.8 | −17.9 | −41.6 | −24.4 | −39.7 |
| % change in volume | 51.4 | 76.7 | 37.6 | 63.7 | 33.4 | 55.5 |
| % change in weight | 37.8 | 57.3 | 25.5 | 44.5 | 23.6 | 41.0 |

TABLE 6

Compounds of Devolatilized Low Tg Polymer

| Example | C301 | 302 |
|---|---|---|
| Component | (phr) | (phr) |
| Ex. C1 | 100.5 | — |
| Ex. 7 | — | 100 |
| A1 | 2 | 2 |
| R1 | 0.5 | 0.5 |
| R2 | 1 | 1.5 |
| R3 | 1.5 | 1.5 |
| F1 | 80 | 80 |
| CA1 | 1.5 | 1.5 |
| CA2 | 4 | 4 |
| Total, phr | 191 | 191 |

TABLE 7

Properties of Compound of Devolatilized Low Tg Polymer
Rheology of Compounds

| Example | C301 | 302 |
|---|---|---|
| Mooney Viscosity | | |
| ML(1 + 4) at 100° C. | 86.3 | 72.5 |
| Mooney Scorch - 121° C. | | |
| Minimum Viscosity - MU | 33.6 | 29.2 |
| t3 - metric minutes | 4.97 | 4.98 |
| t10 - metric minutes | 7.63 | 8.51 |
| t18 - metric minutes | 10.44 | 14.79 |
| MDR summary at 177° C., 1° arc | | |
| ML, lbf-in | 1.61 | 1.56 |
| MH, lbf-in | 34.66 | 28.23 |
| ts2, metric minutes | 0.64 | 0.68 |
| t$_C$50, metric minutes | 2.24 | 2.20 |
| t$_C$90, metric minutes | 8.96 | 10.44 |
| Physical Properties after Cure Press cure at 177° C. for 5 minutes; Post cure at 175° C. for 4 hours | | |
| Stress-Strain and Hardness, Original at 23° C. | | |
| Hardness, Shore A, points | 76.6 | 74.7 |
| Modulus at 100% Elongation, psi | 1922 | 1665 |
| Tensile Strength at break, psi | 2882 | 2461 |
| % Elongation at break | 171 | 161 |
| Tear, Die C, pli | 185 | 163 |
| Tg by DSC, ° C. | −28.4 | −32.2 |
| compression set, ASTM D395-89, method B, plied | | |
| 70 hrs/150° C. | 17.0 | 17.6 |
| 168 hrs/150° C. | 21.1 | 24.0 |
| Age 1 week at 150° C. in air | | |
| Hardness, Shore A, points | 79.7 | 79.5 |
| Modulus at 100% elongation, psi | 1814 | 1482 |
| Tensile strength at break, psi | 2700 | 2034 |
| % Elongation at break | 190 | 154 |
| Tg by DSC, ° C. | −27.3 | −32.5 |
| Change in Hardness, points | 3.1 | 4.8 |
| % change in 100% modulus | −5.6 | −11.0 |

TABLE 7-continued

Properties of Compound of Devolatilized Low Tg Polymer
Rheology of Compounds

| Example | C301 | 302 |
|---|---|---|
| % change in tensile | −6.3 | −17.4 |
| % change in elongation | 11.1 | −4.3 |
| Age 6 weeks at 150° C. in air | | |
| Hardness, Shore A, points | 81.8 | 80.1 |
| Modulus at 100% elongation, psi | 1905 | 1676 |
| Tensile strength at break, psi | 2401 | 1909 |
| % Elongation at break | 168 | 131 |
| Tg by DSC, ° C. | −26.8 | −31.7 |
| Change in Hardness, points | 5.2 | 5.4 |
| % change in 100% modulus | −0.9 | 0.7 |
| % change in tensile | −16.7 | −22.4 |
| % change in elongation | −1.8 | −18.6 |
| Age 1 week at 150° C. in IRM 903 oil | | |
| Hardness, Shore A, points | 57.1 | 53.8 |
| Modulus at 100% elongation, psi | 1631 | — |
| Tensile strength at break, psi | 2230 | 1265 |
| % Elongation at break | 133 | 92 |
| Change in Hardness, points | −19.5 | −20.9 |
| % change in 100% modulus | −15.1 | — |
| % change in tensile | −22.6 | −48.6 |
| % change in elongation | −22.2 | −42.9 |
| % change in volume | 49.0 | 55.1 |
| % change in weight | 34.3 | 37.7 |

TABLE 8

Compounds of Low Tg Polymer with and without
Acid Cure Sites

| Example Component | C401 (phr) | 402 (phr) | 403 (phr) | C404 (phr) | 405 (phr) |
|---|---|---|---|---|---|
| Ex. C1 | 100.5 | — | — | — | — |
| Ex. C2 | — | — | — | 100.75 | — |
| Ex. 29 | — | 100 | — | — | — |
| Ex. 30 | — | — | 100 | — | — |
| Ex. 32 | — | — | — | — | 100 |
| A1 | 2 | 2 | 2 | 1 | 1 |
| R1 | 0.5 | 0.5 | 0.5 | 0.5 | 0.5 |
| R2 | 1 | 1.5 | 1.5 | 0.5 | 1.25 |
| R3 | 1.5 | 1.5 | 1.5 | 1.5 | 1.5 |
| F1 | — | — | 80 | — | — |
| F2 | 80 | 80 | — | 80 | 80 |
| CA1 | 1.5 | 1.5 | 1.5 | — | — |
| CA2 | 4 | 4 | 4 | — | — |
| CA3 | — | — | — | 5 | 6 |
| CA4 | — | — | — | 2 | 2 |
| Total, phr | 191 | 191 | 191 | 191.25 | 192.25 |

TABLE 9

Compound Properties of Low Tg Polymer with and
without Acid Cure Sites
Rheology of Compounds

| Example | C401 | 402 | 403 | C404 | 405 |
|---|---|---|---|---|---|
| Mooney Viscosity | | | | | |
| ML(1 + 4) at 100° C. | 55.0 | 47.0 | 52.3 | 46.5 | 17.3 |
| Mooney Scorch - 121° C. | | | | | |
| Minimum Viscosity - MU | 17.7 | 21.9 | 23.9 | 15.7 | 5.9 |
| t3 - metric minutes | 6.39 | 7.49 | 3.69 | >20 | >20 |
| t10 - metric minutes | 10.09 | 17.12 | 10.51 | >20 | >20 |
| t18 - metric minutes | 13.40 | >20 | 19.67 | >20 | >20 |
| MDR summary at 177° C., 1° arc | | | | | |
| ML, lbf-in | 0.81 | 0.85 | 1.11 | 0.97 | 0.53 |
| MH, lbf-in | 28.82 | 15.50 | 20.57 | 25.00 | 17.38 |
| ts2, metric minutes | 0.75 | 1.10 | 0.85 | 0.71 | 0.77 |
| t$_C$50, metric minutes | 2.46 | 4.34 | 4.03 | 1.70 | 2.22 |
| t$_C$90, metric minutes | 9.35 | 19.96 | 19.66 | 5.22 | 6.44 |

Physical Properties after Cure
C401, 402 and 403: Press cure at 177° C. for 5 min.;
Post cure at 175° C. for 4 hrs
C404 and 405: Press cure at 180° C. for 10 minutes,
Post cure at 175° C. for 1 hour Stress-Strain and Hardness, Original at 23° C.

| | C401 | 402 | 403 | C404 | 405 |
|---|---|---|---|---|---|
| Hardness, Shore A, points | 71.1 | 70.5 | 76.3 | 69.0 | 61.7 |
| Modulus at 100% Elongation, psi | 1181 | 999 | 1552 | 1306 | 771 |
| Tensile Strength at break, psi | 2503 | 2110 | 2194 | 2489 | 1506 |
| % Elongation at break | 227 | 201 | 149 | 178 | 181 |
| Tear, Die C, pli | 194 | 158 | 130 | 153 | 102 |
| Tg by DSC, ° C. | −27.7 | −35.7 | −38.2 | −27.5 | −34.8 |

TABLE 9-continued

Compound Properties of Low Tg Polymer with and
without Acid Cure Sites
Rheology of Compounds

| Example | C401 | 402 | 403 | C404 | 405 |
|---|---|---|---|---|---|
| Compression set, ASTM D395-89, method B, plied | | | | | |
| 168 hrs/150° C. | 22.1 | 39.0 | 33.8 | 19.0 | 23.9 |
| Example | C401 | 402 | 403 | C404 | 405 |
| Age 1 week at 150° C. in air | | | | | |
| Hardness, Shore A, points | 76.6 | 70.8 | 75.4 | 77.3 | 67.5 |
| Modulus at 100% elongation, psi | 1254 | 1074 | 1569 | 1337 | 914 |
| Tensile strength at break, psi | 2356 | 1987 | 2042 | 2417 | 1631 |
| % Elongation at break | 216 | 196 | 143 | 189 | 173 |
| Tg by DSC, ° C. | −27.0 | −34.3 | −39.6 | −26.2 | −32.2 |
| Change in Hardness, points | 5.5 | 0.3 | −0.9 | 8.3 | 5.8 |
| % change in 100% modulus | 6.2 | 7.5 | 1.1 | 2.4 | 18.5 |
| % change in tensile | −5.9 | −5.8 | −6.9 | −2.9 | 8.3 |
| % change in elongation | −4.8 | −2.5 | −4.0 | 6.2 | −4.4 |
| Age 3 weeks at 150° C. in air | | | | | |
| Hardness, Shore A, points | 75.5 | 71.3 | 78.0 | 77.6 | 65.7 |
| Modulus at 100% elongation, psi | 1191 | 1032 | 1447 | 1301 | 996 |
| Tensile strength at break, psi | 2277 | 1819 | 1786 | 2171 | 1696 |
| % Elongation at break | 233 | 197 | 141 | 172 | 171 |
| Tg by DSC, ° C. | −26.1 | −34.6 | −38.8 | −25.3 | −32.4 |
| Change in Hardness, points | 4.4 | 0.8 | 1.7 | 8.3 | 5.8 |
| % change in 100% modulus | 0.8 | 3.3 | −6.8 | −0.4 | 29.2 |
| % change in tensile | −9.0 | −13.8 | −18.6 | −12.8 | 12.6 |
| % change in elongation | 2.6 | −2.0 | −5.4 | −3.4 | −5.5 |
| Age 6 weeks at 150° C. in air | | | | | |
| Hardness, Shore A, points | 75.4 | 73.1 | 81.0 | 76.3 | 75.2 |
| Modulus at 100% elongation, psi | 1211 | 1092 | 1691 | 1264 | 1034 |
| Tensile strength at break, psi | 1979 | 1729 | 1859 | 2242 | 1607 |
| % Elongation at break | 177 | 176 | 122 | 185 | 166 |
| Tg by DSC, ° C. | −27.1 | −33.9 | −38.5 | −24.1 | −31.0 |
| Change in Hardness, points | 4.3 | 2.6 | 4.7 | 7.3 | 13.5 |
| % change in 100% modulus | 2.5 | 9.3 | 9.0 | −3.2 | 34.1 |
| % change in tensile | −20.9 | −18.1 | −15.3 | −9.9 | 6.7 |
| % change in elongation | −22.0 | −12.4 | −18.1 | 3.9 | −8.3 |
| Age 1 week at 150° C. in IRM 903 oil | | | | | |
| Hardness, Shore A, points | 54.9 | 46.7 | 53.1 | 49.2 | 41.1 |
| Modulus at 100% elongation, psi | 1176 | 1073 | — | 1098 | 717 |
| Tensile strength at break, psi | 1915 | 1069 | 1017 | 1732 | 761 |
| % Elongation at break | 157 | 100 | 77 | 138 | 108 |
| Change in Hardness, points | −16.2 | −23.8 | −23.2 | −19.8 | −20.6 |
| % change in 100% modulus | −0.4 | 7.4 | — | −15.9 | −7.0 |
| % change in tensile | −23.5 | −49.3 | −53.6 | −30.4 | −49.5 |
| % change in elongation | −30.8 | −50.2 | −48.3 | −22.5 | −40.3 |
| % change in volume | 49.0 | 75.0 | 79.7 | 40.2 | 63.6 |
| % change in weight | 34.4 | 53.8 | 57.5 | 28.6 | 44.7 |

The following Examples illustrate blends of this invention comprising ethylene copolymers derived from ethylene and at least two different alkyl acrylates comonomers, with or without additional comonomer containing acid cure sites, and additional copolymers ethylene alkyl acrylate copolymers or polyacrylate copolymers.

Example 501 is an E/MA/nBA/EHM copolymer prepared and finished by reactive extrusion according to the method similar to those described above for Example 7.

Example C501 is a polyacrylate copolymer of ethyl acrylate (approximately 54 mole %) and n-butyl acrylate and either 1.4 weight % monobutyl fumarate (MBF) or 1.5 weight % itaconic acid monobutyl ester (MBI) [the amount of acid cure sites, but not the comonomer type, was determined by titration], with a trace amount of an alkyl phenol surfactant, commercially available under the tradename AR-12 from Zeon.

TABLE 10

| Example | Wt. % E | Wt. % MA | Wt. % nBA | Wt. % EHM | Tg (° C.) | VI (%) |
|---|---|---|---|---|---|---|
| 501 | 30.3 | 22.0 | 43.8 | 3.9 | −44.2 | 89.9% |

TABLE 11

Compounds of Devolatilized Low Tg Polymer

| Example Component | C601 (phr) | C602 (phr) | 603 (phr) | 604 (phr) | 605 (phr) |
|---|---|---|---|---|---|
| C1 | 100 | — | 50 | — | — |
| 501 | — | — | 50 | 50 | 100 |

TABLE 11-continued

Compounds of Devolatilized Low Tg Polymer

| Example Component | C601 (phr) | C602 (phr) | 603 (phr) | 604 (phr) | 605 (phr) |
|---|---|---|---|---|---|
| C501 | — | 100 | — | 50 | — |
| A1 | 2 | 2 | 2 | 2 | 2 |
| R3 | 1.5 | 2 | 1.5 | 1.5 | 1.5 |
| R2 | 1 | 1 | 1 | 1 | 1.5 |
| R1 | 0.5 | 0.5 | 0.5 | 0.5 | 0.5 |
| F1 | 55 | 67 | 55 | 67 | 55 |
| CA1 | 1.5 | 0.6 | 1.5 | 1.1 | 1.25 |
| CA2 | 4 | 2 | 4 | 3 | 2 |
| Total, phr | 165.5 | 175.1 | 165.5 | 176.1 | 163.75 |

TABLE 12

Properties of Low Tg Blends without Plasticizers
Rheology of Compounds

| Example | C601 | C602 | 603 | 604 | 605 |
|---|---|---|---|---|---|
| Mooney Viscosity | | | | | |
| ML(1 + 4) at 100° C. | 56.4 | 73.4 | 48.1 | 67.9 | 68.7 |
| Mooney Scorch - 121° C. | | | | | |
| Minimum Viscosity - MU | 18.5 | 34.7 | 16.4 | 32.0 | 38.2 |
| t3 - metric minutes | 6.96 | 5.04 | 5.28 | 4.83 | 5.65 |
| t10 - metric minutes | 11.28 | 7.09 | 8.9 | 6.86 | 9.98 |
| t18 - metric minutes | 15.59 | 8.60 | 13.81 | 8.25 | 15.32 |
| MDR summary at 177, 1° arc | | | | | |
| ML, lbf-in | 0.80 | 3.37 | 0.75 | 2.41 | 1.42 |
| MH, lbf-in | 29.34 | 20.61 | 24.95 | 24.56 | 15.58 |
| ts2, metric minutes | 0.78 | 0.54 | 0.73 | 0.57 | 0.87 |
| t$_C$50, metric minutes | 2.54 | 1.70 | 2.27 | 1.98 | 2.34 |
| t$_C$90, metric minutes | 8.14 | 9.49 | 8.08 | 7.78 | 11.81 |
| Physical Properties after Cure Press cure at 177° C. for 5 minutes; Post cure at 175° C. for 4 hours | | | | | |
| Stress-Strain and Hardness, Original at 23° C. | | | | | |
| Hardness, Shore A, points | 74.5 | 71.9 | 72.5 | 73.9 | 62.2 |
| Modulus at 100% Elongation, psi | 933 | 734 | 900 | 1267 | 594 |
| Tensile Strength at break, psi | 2590 | 1545 | 2305 | 1758 | 1983 |
| % Elongation | 296 | 210 | 254 | 145 | 267 |
| Tear, Die C, pli | 222 | 123 | 174 | 122 | 147 |
| Tg by DSC, ° C. | −28.79 | −29.71 | −38.58 | −40.35 & −29.58* | −42.8 |
| Compression Set, ASTM D395-89 Method B, Type 1, Plied | | | | | |
| 70 hours at 150° C. | 13.9 | 12.3 | 13.4 | 15.4 | 20.8 |
| 168 hours at 150° C. | 19.5 | 12.9 | 24.1 | 20.7 | 28.6 |
| Age 1 week at 150° C. in air | | | | | |
| Hardness, Shore A, points | 76.2 | 72.0 | 72.4 | 75.6 | 63.7 |
| Modulus at 100% elongation, psi | 986 | 671 | 954 | 1280 | 687 |
| Tensile strength at break, psi | 2664 | 1425 | 2322 | 1554 | 2072 |
| % Elongation at break | 304 | 228 | 249 | 127 | 239 |
| Tg by DSC, ° C. | −27.94 | −29.55 | −37.44 | −42.60 & −30.33* | −42.71 |
| Change in Hardness, points | 1.7 | 0.1 | −0.1 | 1.7 | 1.5 |
| % change in 100% modulus | 5.7 | −8.6 | 6.0 | 1.0 | 15.7 |
| % change in tensile | 2.9 | −7.8 | 0.7 | −11.6 | 4.5 |
| % change in elongation | 2.7 | 8.6 | −2.0 | −12.4 | −10.5 |
| Age 3 weeks at 150° C. in air | | | | | |
| Hardness, Shore A, points | 77.5 | 74.6 | 74.1 | 78.3 | — |
| Modulus at 100% elongation, psi | 983 | 753 | 933 | 1281 | — |
| Tensile strength at break, psi | 2484 | 1319 | 2103 | 1691 | — |

TABLE 12-continued

Properties of Low Tg Blends without Plasticizers
Rheology of Compounds

| Example | C601 | C602 | 603 | 604 | 605 |
|---|---|---|---|---|---|
| % Elongation at break | 295 | 230 | 237 | 155 | — |
| Tg by DSC, ° C. | −28.64 | −29.44 | −36.75 | −42.41 & −29.15* | — |
| Change in Hardness, points | 3 | 2.7 | 1.6 | 4.4 | — |
| % change in 100% modulus | 5.4 | 2.6 | 3.7 | 1.1 | — |
| % change in tensile | −4.1 | −14.6 | −8.8 | −3.8 | — |
| % change in elongation | −0.3 | 9.5 | −6.7 | 6.9 | — |
| Age 6 weeks at 150° C. in air | | | | | |
| Hardness, Shore A, points | 79.2 | 75.4 | 76.1 | 80.3 | — |
| Modulus at 100% elongation, psi | 1024 | 702 | 986 | 1242 | — |
| Tensile strength at break, psi | 2326 | 1177 | 2152 | 1599 | — |
| % Elongation at break | 278 | 223 | 240 | 146 | — |
| Tg by DSC, ° C. | −27.39 | −29.75 | −37.95 | −40.71 & −27.17* | — |
| Change in Hardness, points | 4.7 | 3.5 | 3.6 | 6.4 | — |
| % change in 100% modulus | 9.8 | −4.4 | 9.6 | −2.0 | — |
| % change in tensile | −10.2 | −23.8 | −6.6 | −9.0 | — |
| % change in elongation | −6.1 | 6.2 | −5.5 | 0.7 | — |
| Age 1 week at 150° C. in IRM 903 oil | | | | | |
| Hardness, Shore A, points | 53.1 | 53.3 | 48.1 | 53.6 | 45.6 |
| Modulus at 100% elongation, psi | 1017 | 811 | 927 | 1161 | 828 |
| Tensile strength at break, psi | 2028 | 1426 | 1305 | 1183 | 882 |
| % Elongation at break | 198 | 170 | 132 | 103 | 109 |
| Change in Hardness, points | −21.4 | −18.6 | −24.4 | −20.3 | −16.6 |
| % change in 100% modulus | 9.0 | 10.5 | 3.0 | −8.4 | 39.4 |
| % change in tensile | −21.7 | −7.7 | −43.4 | −32.7 | −55.5 |
| % change in elongation | −33.1 | −19.0 | −48.0 | −29.0 | −59.2 |
| % change in volume | 53.89 | 31.93 | 71.88 | 54.04 | 97.95 |
| % change in weight | 40.6 | 22.89 | 54.41 | 38.32 | 73.78 |
| Low Temperature Properties | | | | | |
| Brittle Point, ° C. (ASTM D2137-94) | −32 | −22 | −35 | −32 | — |
| Tg by DSC, ° C. | −28.79 | −29.71 | −38.58 | −40.35 & −29.58* | — |

*two inflection points

Having thus described and exemplified the invention with a certain degree of particularity, it should be appreciated that the following claims are not to be so limited but are to be afforded a scope commensurate with the wording of each element of the claim and equivalents thereof.

We claim:

1. A copolymer, for improving the low temperature range of cured compounds while maintaining high temperature and oil resistance, comprising:
   (a) from 10 to 50 weight % of ethylene comonomer;
   (b) from 5 to 55 weight % of a first alkyl acrylate comonomer;
   (c) from 15 to 80 weight % of a second alkyl acrylate comononer; and optionally
   (d) from 0 to 7 weight % of a monoalkyl ester of 1,4-butene-dioic acid comonomer,
     wherein the first alkyl acrylate is different from the second alkyl acrylate and all percentages are based on the total weight of components (a) through (d) in said copolymer.

2. A copolymer of claim 1 wherein said monoalkyl ester of 1,4-butene-dioic acid comonomer is front 0.5 to 7 weight %.

3. A copolymer of claim 1 comprising:
   (a) from 18 to 50 weight % of ethylene comonomer;
   (b) from 10 to 40 weight % of a first alkyl acrylate comononer;
   (c) from 15 to 65 weight % of a second alkyl acrylate comonomer; and
   (d) from 2 to 5 weight % of a monoalkyl ester of 1,4-butene-dioic acid comonomer.

4. A copolymer of any of claims 1 through 3 wherein said first alkyl acrylate is either methyl acrylate or ethyl acrylate and said second alkyl acrylate has from 2 to 10 carbon atoms in the alkyl group.

5. A copolymer of claim 4 wherein said second alkyl acrylate has from 4 to 8 carbon atoms in the alkyl group.

6. A copolymer of claim 5 wherein said first alkyl acrylate is methyl acrylate and said second alkyl acrylate is n-butyl acrylate.

7. A copolymer of claim 6 wherein the total acrylate content comprises from about 40 to 75 weight percent of said copolymer.

8. A copolymer of claim 7 wherein the total acrylate content comprises from about 47 to 70 weight percent of the copolymer.

9. A copolymer of claim 6 comprising:
   (a) from 21 to 41 weight % of ethylene comonomer;
   (b) from 20 to 28 weight % of methyl acrylate comonomer;
   (c) from 36 to 46 weight % of n-butyl acrylate comonomer; and
   (d) from 3 to 5 weight % of a monoethyl ester of 1,4-butene-dioic acid comonomer.

10. A compounded composition comprising a copolymer of any of claims 1 through 3 and further comprising at least one additional component selected from the group consisting of antioxidants, internal release agents, plasticizers, cure agents, accelerators, and fillers.

11. A compounded composition of claim 10 wherein said second alkyl acrylate has from 4 to 8 carbon atoms in the alkyl group.

12. A compounded composition of claim 11 wherein said first alkyl acrylate is methyl acrylate and said second alkyl acrylate is n-butyl acrylate.

13. A compounded composition of claim 12 wherein the total acrylate content comprises from about 40 to 75 weight percent of the copolymer.

14. A compounded composition of claim 13 wherein the total acrylate content comprises from about 47 to 70 weight percent of the copolymer.

15. A compounded composition of claim 12 comprising a copolymer comprising
   (a) from 21 to 41 weight % of ethylene comonomer;
   (b) from 20 to 28 weight % of methyl acrylate comonomer;
   (e) from 36 to 46 weight % of n-butyl acrylate comonomer; and
   (d) from 3 to 5 weight % of a monoethyl ester of 1,4-butene-dioic acid comonomer.

16. An elastomeric composition comprising a compounded composition of claim 10 wherein said compounded composition is cured for sufficient time to crosslink said copolymer, and optionally post-cured to further cure and crosslink said copolymer.

17. An elastomeric composition of claim 16 wherein said second alkyl acrylate has from 4 to 8 carbon atoms in the alkyl group.

18. An elastomeric composition of claim 17 wherein said first alkyl acrylate is methyl acrylate and said second alkyl acrylate is n-butyl acrylate.

19. The elastomeric composition of claim 18 wherein the total acrylate content comprises from about 40 to 75 weight percent of the copolymer.

20. The elastomeric composition of claim 19 wherein the total acrylate content comprises from about 47 to 70 weight percent of the copolymer.

21. The elastomeric composition of claim 18 comprising a copolymer comprising
   (a) from 21 to 41 weight % of ethylene comonomer;
   (b) from 20 to 28 weight % of methyl acrylate comonomer;
   (c) from 36 to 46 weight % of n-butyl acrylate comonomer; and
   (d) from 3 to 5 weight % of a monoethyl ester of 1,4-butene-dioic acid comonomer.

22. An article selected from the group consisting of ignition wire jacketing, bases) dampers, seals, gaskets, spark plug boots, constant velocity joint boots and shaft boots that is formed by
   (a) providing a copolymer of claim 1;
   (b) compounding said copolymer with at least one additional component selected from the group consisting of antioxidants, internal release agents, plasticizers, cure agents, accelerators, and, fillers to form a compounded composition;
   (c) forming said compounded composition into a desired shape; and
   (d) curing said compounded composition for sufficient time to crosslink said copolymer, and optionally post-curing to further cure said compounded composition.

23. An ethylene copolymer, for improving the low temperature range of cured compounds while maintaining high temperature and oil resistance, derived from copolymerization of ethylene, methyl acrylata comonomer, n-butyl acrylate comonomer and optionally from 0 to 7 weight % of a monoalkyl ester of 1,4-butene-dioic acid comonomer; wherein said methyl acrylate is present in said copolymer from a lower limit of 5 weight % to an upper limit which varies linearly from 45 weight % when n-butyl acrylate is present at 41 weight % to 47.5 weight % when n-butyl acrylate is present at 15 weight % and wherein said n-butyl acrylate is present in said copolymer from a lower limit of 15 weight % when methyl acrylate is present within the range of 23 to 47.5 weight % and from a lower limit of 57 weight % when methyl acrylate is present a 5 weight % and from lower limit that varies linearly between said lower limit at 5 weight % methyl acrylate and said lower limit at 23 weight % methyl acrylate to an upper limit of 41 weight % when methyl acrylate is present at 45 weight % and to an upper limit of 80 weight % when methyl acrylate is present at 5 weight 9/a and to an upper limit that varies linearly between 45 and 5 weight % methyl acrylate, and the remainder is ethylene.

24. A copolymer of claim 1 wherein said first alkyl acrylate comonomer is methyl acrylate present in said copolymer at 10 to 40 weight % and wherein said second alkyl acrylate comonomer is n-butyl acrylate present in said copolymer from a lower limit of 15 weight % when methyl acrylate is present within the range of 23 to 40 weight % and from a lower limit of 47 weight % when methyl acrylate is present a 10 weight % and from lower limit that varies linearly between said lower limit at 10 weight % methyl acrylate and said lower limit at 23 weight % methyl acrylate to an upper limit of 35 weight % when methyl acrylate is present at 40 weight % and to an upper limit of 65 weight % when methyl acrylate is present at 10 weight % and to an upper limit that varies linearly between 40 and 10 weight % methyl acrylate.

25. A copolymer of claim 1 wherein said first alkyl acrylate comonomer is methyl acrylate present in said copolymer at 15 to 30 weight % and wherein said second alkyl acrylate comonomer is n-butyl acrylate present in said copolymer from a lower limit of 20 weight % when methyl acrylate is present within the range of 27 to 30 weight % and from a lower limit of 45 weight % when methyl acrylate is present a 15 weight % and from lower limit that varies linearly between said lower limit at 15 weight % methyl acrylate and said lower limit at 27 weight % methyl acrylate to an upper limit of 45 weight % when methyl acrylate is present at 30 weight % and to an upper limit of 60 weight % when methyl acrylate is present at 15 weight % and to an upper limit that varies linearly between 30 and 15 weight % methyl acrylate.

26. A copolymer of claim 25 wherein said monoalkyl ester of 1,4-butene-dioic acid comonomer is ethyl hydrogen maleate at 0.5 to 7 weight %.

27. A copolymer of claim 25 wherein said monoalkyl ester of 1,4-butene-dioic acid comonomer is ethyl hydrogen maleate present at 2 to 5 weight %.

28. A compounded composition comprising a copolymer of any of claims 23 through 27 and further comprising at least one additional component selected from the group consisting of antioxidants, internal release agents, plasticizers, cure agents, accelerators, and fillers.

29. An elastomeric composition comprising a compounded composition of claim 28 wherein said compounded composition is cured for sufficient time to crosslink said copolymer, and optionally post-cured to further cure and crosslink said copolymer.

30. An ethylene copolymer of claim 23 wherein the glass transition temperature, Tg, is −47° C. to −30° C.

31. An elastomeric composition of claim 29 wherein the volume increase, VI, of said elastomeric composition is equal to or less than 110%.

32. A rubber article comprising an elastomeric composition of claim 29.

33. A rabber article comprising an elastonieric composition of claim 29.

34. A blend of a copolymer of any of claims 1 through 3 in combination with at least one additional copolymer selected from the group consisting of ethylene alkyl acrylate copolymers and polyacrylate copolymers.

35. A compounded composition comprising a copolymer blend of claim 34 and further comprising at least one additional component selected from the group consisting of antioxidants, internal release agents, plasticizers, cure agents, accelerators, and fillers.

36. An elastomeric composition comprising a compounded composition of claim 35 wherein said compounded composition is cured for sufficient time to crosslink said copolymer, and optionally past-cured to further cure and crosslink said copolymer.

* * * * *

UNITED STATES PATENT AND TRADEMARK OFFICE
CERTIFICATE OF CORRECTION

PATENT NO. : 7,153,918 B2 Page 1 of 1
APPLICATION NO. : 10/892006
DATED : December 26, 2006
INVENTOR(S) : Wu Yun-Tai et al.

It is certified that error appears in the above-identified patent and that said Letters Patent is hereby corrected as shown below:

Claim 2, Column 29, Line 60 - delete "front", replace with --from--
Claim 22, Column 31, Line 51 - delete "bases)", replace with --hoses,--
Claim 23, Column 32, Line 18 - delete "9/a", replace with --%--

Signed and Sealed this

Thirteenth Day of November, 2007

JON W. DUDAS
*Director of the United States Patent and Trademark Office*